US011989370B2

(12) United States Patent
Shigetaka

(10) Patent No.: US 11,989,370 B2
(45) Date of Patent: May 21, 2024

(54) ELECTROSTATIC INPUT DEVICE

(71) Applicant: ALPS ALPINE CO., LTD., Tokyo (JP)

(72) Inventor: Hiroshi Shigetaka, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/172,475

(22) Filed: Feb. 22, 2023

(65) Prior Publication Data
US 2023/0195261 A1    Jun. 22, 2023

Related U.S. Application Data

(63) Continuation of application No. PCT/JP2021/032307, filed on Sep. 2, 2021.

(30) Foreign Application Priority Data

Oct. 2, 2020  (JP) .................. 2020-167755

(51) Int. Cl.
*G06F 3/041*    (2006.01)
*G06F 3/044*    (2006.01)

(52) U.S. Cl.
CPC ........ *G06F 3/0418* (2013.01); *G06F 3/04164* (2019.05); *G06F 3/044* (2013.01); *G06F 2203/04107* (2013.01); *G06F 2203/04108* (2013.01)

(58) Field of Classification Search
CPC .... G06F 3/0418; G06F 3/04164; G06F 3/044; G06F 3/041; G06F 3/0442; G06F 3/0445; G06F 3/0446; G06F 2203/04107; G06F 2203/04108
See application file for complete search history.

(56) References Cited

U.S. PATENT DOCUMENTS

2014/0184552 A1*  7/2014  Tanemura ............. G06F 3/0446
                                                                  345/174
2017/0269776 A1*  9/2017  Katsurahira ........ G06F 3/04166

FOREIGN PATENT DOCUMENTS

| JP | 2011-180401 | 9/2011 | |
| JP | 2016-033830 | 3/2016 | |
| WO | 2018/051487 | 3/2018 | |
| WO | WO-2018051487 A1 * | 3/2018 | ............. G06F 3/041 |

OTHER PUBLICATIONS

International Search Report for PCT/JP2021/032307 mailed on Oct. 12, 2021.

* cited by examiner

*Primary Examiner* — Brent D Castiaux
(74) *Attorney, Agent, or Firm* — IPUSA, PLLC

(57) ABSTRACT

An electrostatic input device includes: a plurality of first detection electrodes that are configured to detect approach of an object within a first distance from a detection face; a second detection electrode that is provided between the plurality of first detection electrodes and configured to detect approach of the object within a second distance from the detection face, where the second distance is longer than the first distance; and a detection circuit that is configured to detect change in capacitance of the plurality of first detection electrodes and the second detection electrode.

20 Claims, 11 Drawing Sheets

ELECTROSTATIC INPUT DEVICE

CROSS-REFERENCE TO RELATED APPLICATION

This application is a continuation application of International Application No. PCT/JP2021/032307 filed on Sep. 2, 2021, and designated the U.S., which is based upon and claims priority to Japanese Patent Application No. 2020-167755, filed on Oct. 2, 2020, the entire contents of which are incorporated herein by reference.

BACKGROUND

1. Field of the Invention

The present disclosure relates to an electrostatic input device.

2. Description of the Related Art

A conventionally known touch panel includes: a plurality of first touch sensors in a display region that are able to detect approach to or contact with a detection face; and a plurality of second touch sensors in a frame region that are able to detect approach to or contact with the detection face. The plurality of first touch sensors are capacitive sensors having high-resistance elements that are electrically connected to electrodes (see, for example, Patent Document 1).

CITATION LIST

Patent Document

Patent Document 1: Japanese Laid-Open Patent Publication No. 2016-033830
Patent Document 2: Japanese Laid-Open Patent Publication No. 2011-180401

Such a conventional touch panel includes the plurality of second touch sensors in the frame region outside the region where the first touch sensors are provided, having difficulty in reduction in size.

Therefore, it is an object to provide an electrostatic input device that can be reduced in size.

SUMMARY

An electrostatic input device of an embodiment of the present disclosure includes: a plurality of first detection electrodes that are configured to detect approach of an object to be detected (hereinafter referred to simply as an "object") within a first distance from a detection face; a second detection electrode that is provided between the plurality of first detection electrodes and configured to detect approach of the object within a second distance from the detection face, where the second distance is longer than the first distance; and a detection circuit that is configured to detect change in capacitance of the plurality of first detection electrodes and the second detection electrode.

DESCRIPTION OF THE EMBODIMENTS

Hereinafter, description will be given to an embodiment in which an electrostatic input device of the present disclosure is applied.

Embodiments

Figure 1:
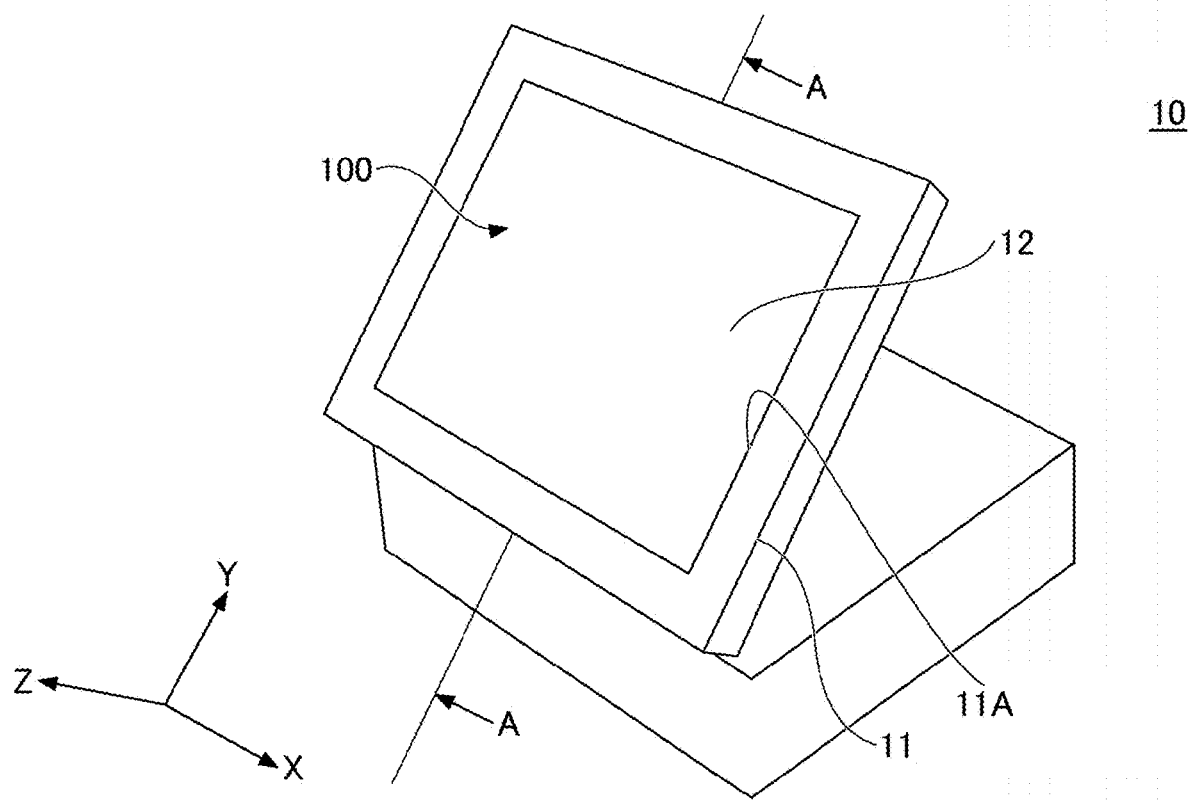
FIG. 1 is a view of an electronic device 10 including an electrostatic input device 100.
Figure 2:
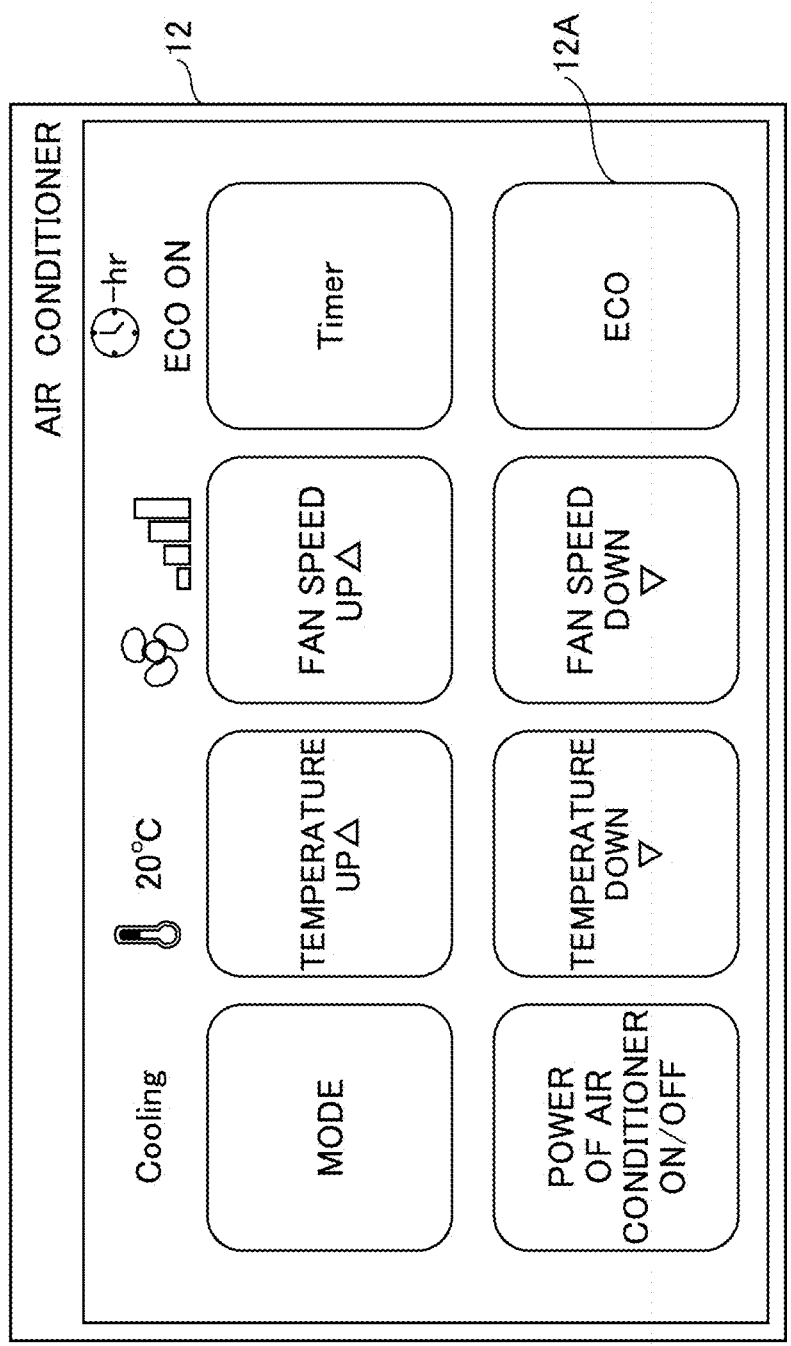
FIG. 2 is a view of an operating section of the electronic device 10.

FIG. 1 is a view of an electronic device 10 including an electrostatic input device 100. FIG. 2 is a view of an operating section of the electronic device 10. The following description will be given defining an XYZ coordinate system. Also, in the following, for the sake of convenience in describing, a plan view refers to a view towards the XY-plane, and the negative direction of a Z axis is referred to as a lower side or being lower and the positive direction of a Z axis is referred to as an upper side or being upper, which however do not express a universal up-and-down relationship.

The electronic device 10 includes a casing 11 and a panel 12 as main components. The casing 11 has a shape of a rectangular frame in the plan view. An open section 11A is provided with the panel 12. The panel 12 is a cover of, for example, a transparent glass plate. On the panel 12, as illustrated in FIG. 2, a plurality of icons 12A for graphic user interface (GUI) are displayed. When a user places his/her hand over any one of the icons 12A on the panel 12, an input is received. Placing the hand over it refers to bringing the hand relatively near the panel 12 without contact.

The panel 12 can display an operating section of various devices. FIG. 2 illustrates, as one example, eight icons 12A on the operating section of an air conditioner (from the upper left to the lower right, MODE, TEMPERATURE UP, FAN SPEED UP, Timer, POWER OF AIR CONDITIONER ON/OFF, TEMPERATURE DOWN, FAN SPEED DOWN, and ECO (energy-saving mode)). For example, placing a hand over the icon 12A of "POWER OF AIR CONDITIONER ON/OFF" can switch ON/OFF of the power of the air conditioner. Such an operation is received by the electrostatic input device 100 included in the electronic device 10. Here, a manner in which the user places the hand over the panel 12 for operating will be described; however, the user can also touch the panel 12 with the hand for operating.

Figure 3:
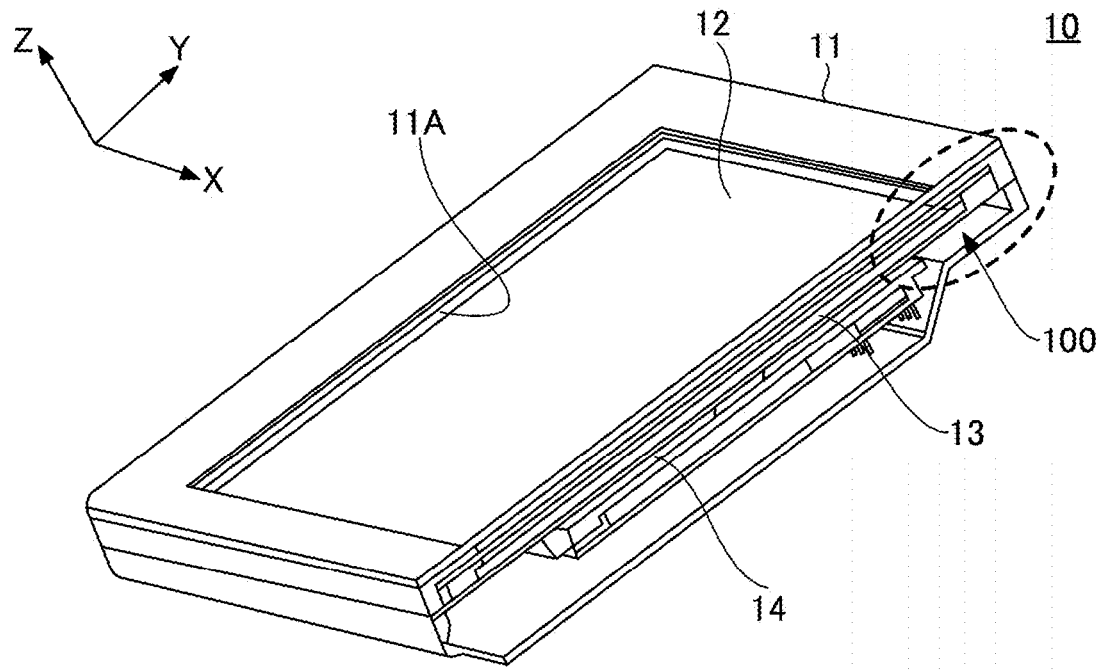
FIG. 3 is a cross-sectional view of the electronic device 10 of FIG. 1, as taken along line A-A and viewed in the direction indicated by arrows A.
Figure 4:
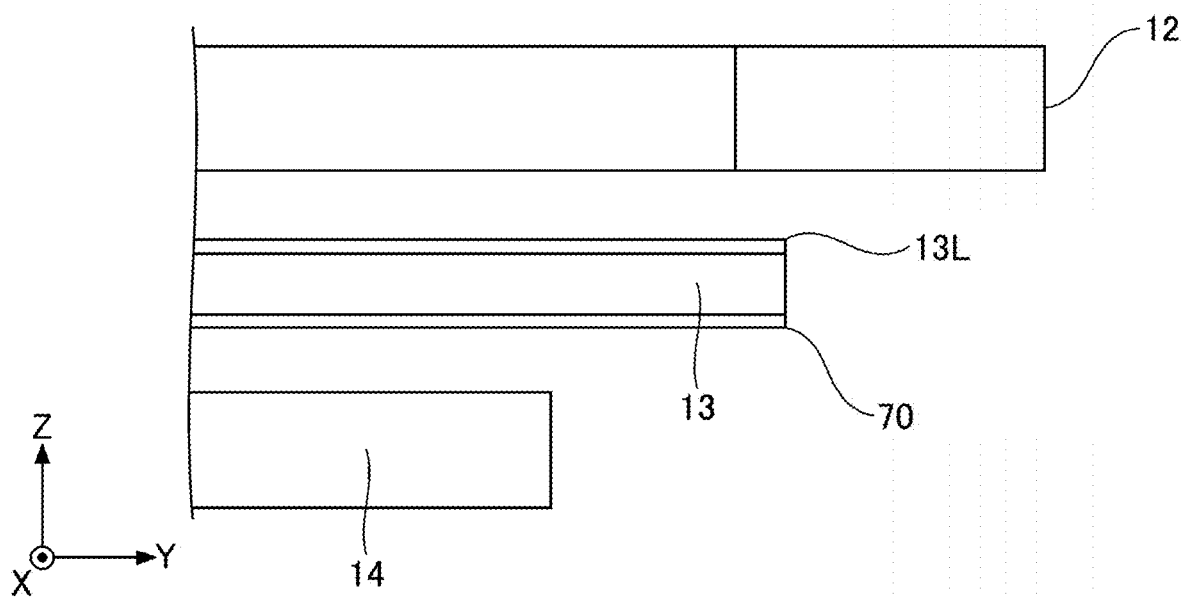
FIG. 4 is an enlarged view of a portion encircled by a dashed line in FIG. 3.

FIG. 3 is a cross-sectional view of the electronic device 10 of FIG. 1, as taken along line A-A and viewed in the direction indicated by arrows A. FIG. 3 illustrates, in addition to the casing 11, a substrate 13 and a liquid crystal display (LCD) 14 included in the electronic device 10. FIG. 4 is an enlarged view of a portion encircled by a dashed line in FIG. 3. As illustrated in FIG. 3 and FIG. 4, on the rear side of the panel 12, the substrate 13 of a transparent acrylic plate, and the LCD 14 are disposed. The upper face of the substrate 13 is provided with an electroconductive layer 13L, and the lower face of the substrate 13 is provided with an active shield electrode 70.

Figure 5:
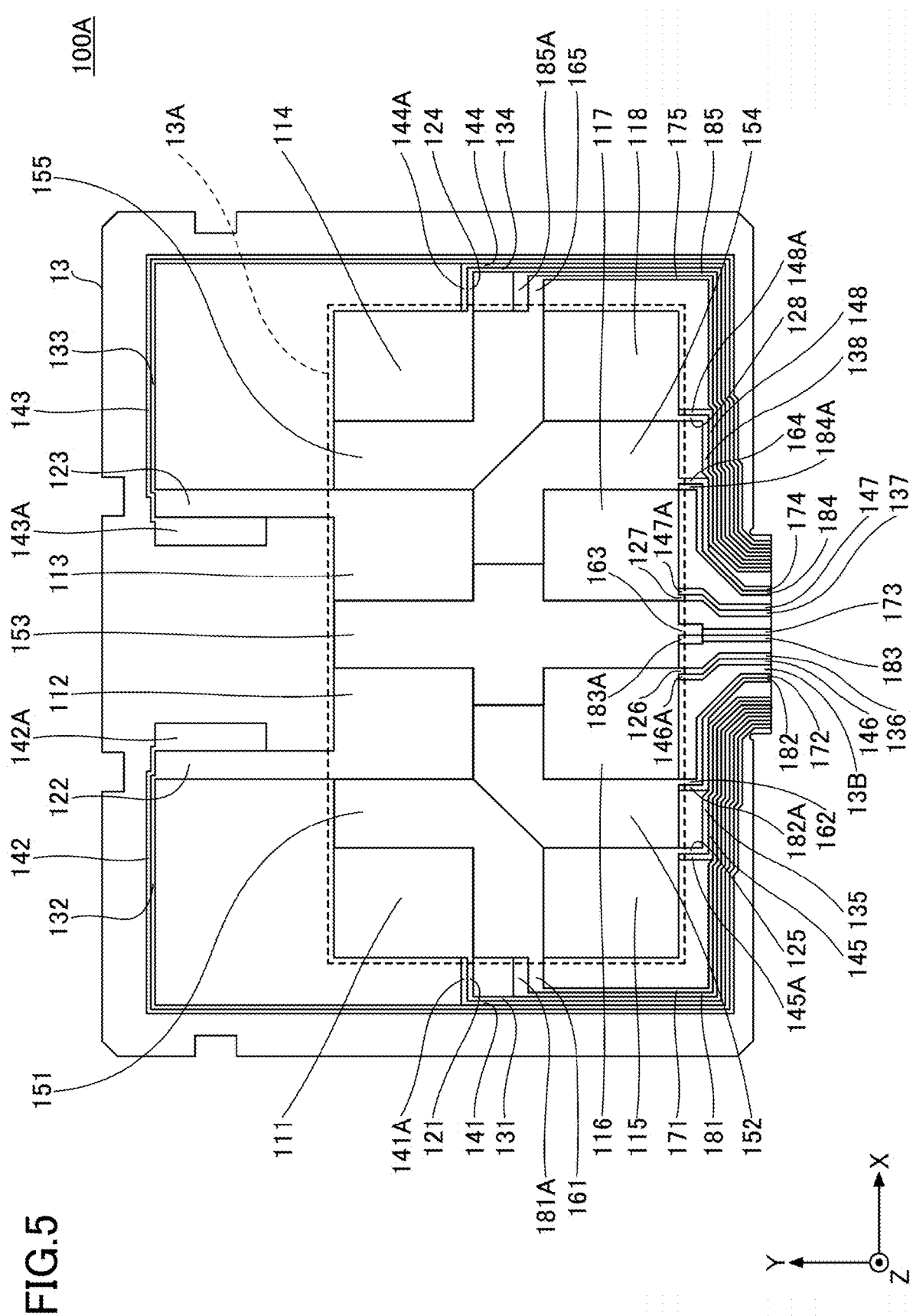
FIG. 5 is a view of an input section 100A of the electrostatic input device 100.
Figure 6:
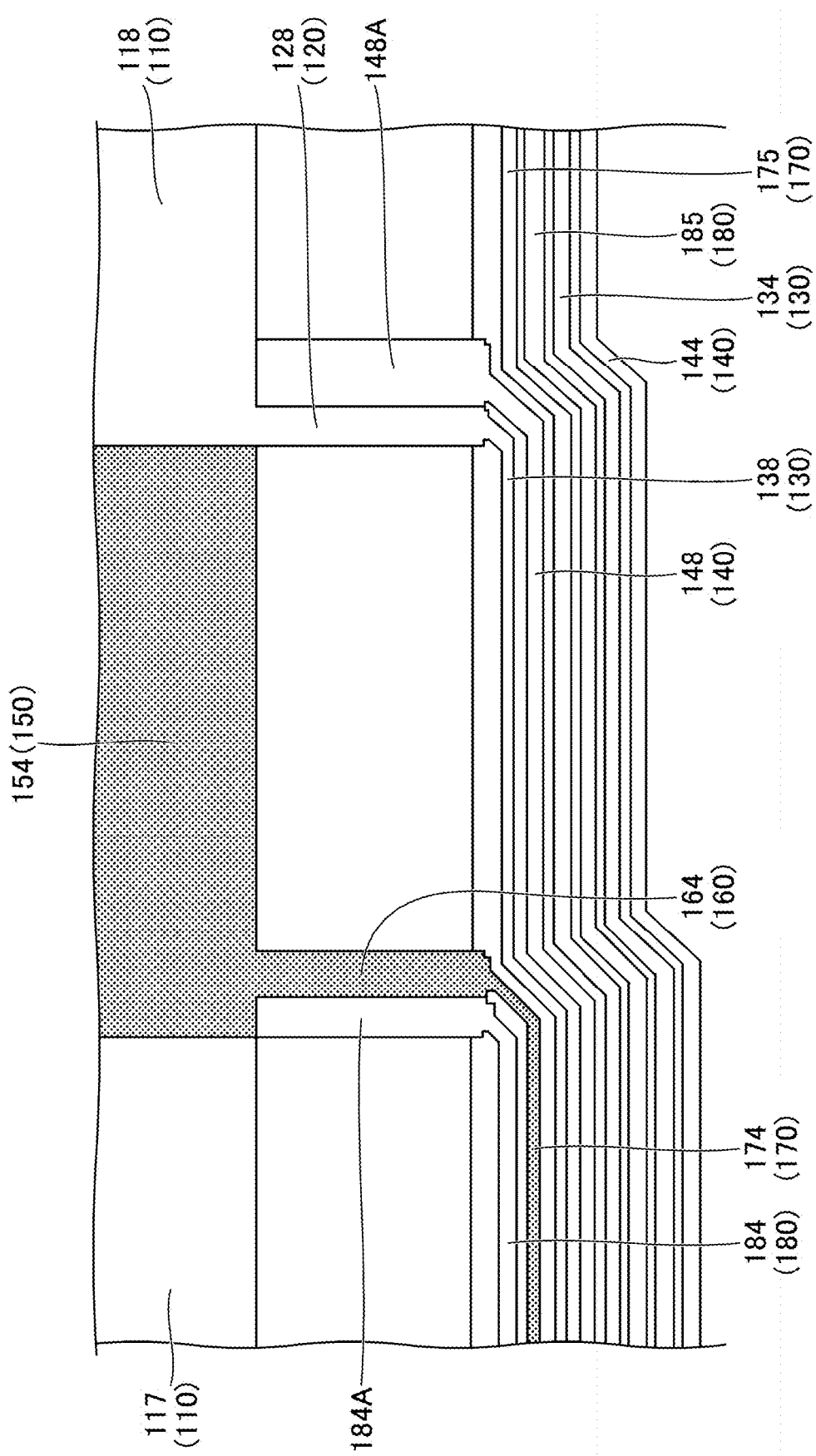
FIG. 6 is a partially enlarged view of FIG. 5.

FIG. 5 is a view of an input section 100A of the electrostatic input device 100. FIG. 6 is a partially enlarged view of FIG. 5. The electrostatic input device 100 is an input device configured to detect capacitance in a self-capacitive manner. The input section 100A includes a substrate 13, eight first detection electrodes 111 to 118, eight first connection electrodes 121 to 128, eight first interconnects 131 to 138, eight first noise cancelling interconnects 141 to 148, eight first widened portions 141A to 148A, five second detection electrodes 151 to 155, five second connection electrodes 161 to 165, five second interconnects 171 to 175, five second noise cancelling interconnects 181 to 185, and five second widened portions 181A to 185A. The input section 100A also includes the active shield electrode 70 as illustrated in FIG. 4, which is however omitted in FIG. 5.

The first detection electrodes 111 to 118, the first connection electrodes 121 to 128, the first interconnects 131 to 138, the first noise cancelling interconnects 141 to 148, the first widened portions 141A to 148A, the second detection electrodes 151 to 155, the second connection electrodes 161 to 165, the second interconnects 171 to 175, the second noise cancelling interconnects 181 to 185, and the second widened portions 181A to 185A are realized by the electroconductive layer 13L on the upper face of the substrate 13.

The first detection electrodes 111 to 118, the first connection electrodes 121 to 128, the first widened portions 141A to 148A, the second detection electrodes 151 to 155, the second connection electrodes 161 to 165, and the second widened portions 181A to 185A are provided in a region over the LCD 14 in the plan view, and are realized by transparent electrodes of, for example, indium tin oxide (ITO). A partial region 13A of an area over the LCD in the plan view is provided with the first detection electrodes 111 to 118 and the second detection electrodes 151 to 155. Also, the first connection electrodes 121 to 128, the first interconnects 131 to 138, the first noise cancelling interconnects 141 to 148, the first widened portions 141A to 148A, the second connection electrodes 161 to 165, the second interconnects 171 to 175, the second noise cancelling interconnects 181 to 185, and the second widened portions 181A to 185A are disposed outside the region 13A. Since the first connection electrodes 121 to 128, the first interconnects 131 to 138, the first noise cancelling interconnects 141 to 148, the first widened portions 141A to 148A, the second connection electrodes 161 to 165, the second interconnects 171 to 175, the second noise cancelling interconnects 181 to 185, and the second widened portions 181A to 185A are disposed outside the region 13A and do not overlap the LCD 14, for example, a non-transparent electric conductor such as a silver ink may be used therefor. Note that, the first connection electrodes 121 to 128, the first interconnects 131 to 138, the first noise cancelling interconnects 141 to 148, the first widened portions 141A to 148A, the second connection electrodes 161 to 165, the second interconnects 171 to 175, the second noise cancelling interconnects 181 to 185, and the second widened portions 181A to 185A may be made of ITO.

The electrostatic input device 100 is an input device configured to detect approach of a user's hand to the panel 12 by the second detection electrodes 151 to 155 and detect the operation on the icons 12A by the first detection electrodes 111 to 118. The range in which the detection is possible by the first detection electrodes 111 to 118 is, as one example, within any of the range of from about 3 cm to about 5 cm from the surface of the panel 12 (see FIG. 1 to FIG. 3). The range in which the detection is possible by the second detection electrodes 151 to 155 is, as one example, within about 10 cm from the surface of the panel 12. The surface of the panel 12 is one example of the detection face. The distance from the surface of the panel 12 representing the range in which the detection is possible by the first detection electrodes 111 to 118 is one example of the first distance, and the distance from the surface of the panel 12 representing the range in which the detection is possible by the second detection electrodes 151 to 155 is one example of the second distance. The second distance is longer than the first distance.

The electrostatic input device 100 is an input device configured to detect approach of a user's hand within about 10 cm from the surface of the panel 12 by the second detection electrodes 151 to 155 and detect approach within any of the range of from about 3 cm to about 5 cm from the surface of the panel 12 by the first detection electrodes 111 to 118. For example, in a state where the electronic device 10 including the electrostatic input device 100 turns off display of the LCD 14, when approach of a user's hand to the panel 12 is detected by the second detection electrodes 151 to 155, the LCD 14 is turned on to display the image as illustrated in FIG. 2. When approach to any of the first detection electrodes 111 to 118 is detected, the operation on the icon 12A corresponding to the first detection electrode that has detected the approach (any one of 111 to 118) is received, and the electronic device 10 performs the function corresponding to the operated icon 12A (for example, fan speed control or temperature control of the air conditioner). When the approach of the user's hand to the panel 12 is not detected by the second detection electrodes 151 to 155, the LCD 14 may display the time. By displaying the icon 12A only when the hand approaches the panel 12, one screen can have a plurality of functions. Alternatively, when the approach of the user's hand to the panel 12 is not detected by the second detection electrodes 151 to 155, the LCD 14 may be turned off. This is because by turning on the LCD 14 only when the hand approaches the panel 12, the power consumed is reduced.

In the region 13A, the first detection electrodes 111 to 118 are arranged in four columns in the X direction and in two rows in the Y direction, and are disposed at equal intervals in the X direction and the Y direction. More specifically, the first detection electrodes 111 to 114 are arranged in the row on the +Y direction side from the −X direction to the +X direction, and the first detection electrodes 115 to 118 are arranged in the row on the −Y direction side from the −X direction to the +X direction. The positions of the first detection electrodes 111 to 118 correspond to the positions of the eight icons 12A as illustrated in FIG. 2. Between the first detection electrodes 111 to 118, the second detection electrodes 151 to 155 are provided. The first detection electrodes 111 to 118 are, as one example, electrodes having rectangular shapes having longer sides in the Y direction, and the first connection electrodes 121 to 128 are electrically connected thereto.

The first connection electrodes 121 to 128 electrically connect the first detection electrodes 111 to 118 to the first interconnects 131 to 138. The first connection electrodes 121 to 128 are provided outside the region 13A on the upper face of the substrate 13.

The first connection electrode 121 is electrically connected to the first detection electrode 111, and extended in the −X direction. The first connection electrode 121 is electrically connected to the −Y direction end of the −X direction-facing side of the first detection electrode 111. The first connection electrode 122 is electrically connected to the first detection electrode 112, and extended in the +Y direction. The first connection electrode 122 is electrically connected to the −X direction end of the +Y direction-facing side of the first detection electrode 112. The first connection electrode 123 is electrically connected to the first detection electrode 113, and extended in the +Y direction. The first connection electrode 123 is electrically connected to the +X direction end of the +Y direction-facing side of the first detection electrode 113. The first connection electrode 124 is electrically connected to the first detection electrode 114, and extended in the +X direction. The first connection electrode 124 is electrically connected to the −Y direction end of the +X direction-facing side of the first detection electrode 114.

The first connection electrode 125 is electrically connected to the first detection electrode 115, and extended in the −Y direction. The first connection electrode 125 is electrically connected to the +X direction end of the −Y direction-facing side of the first detection electrode 115. The first connection electrode 126 is electrically connected to the first detection electrode 116, and extended in the −Y direction. The first connection electrode 126 is electrically connected to the +X direction end of the −Y direction-facing side of the first detection electrode 116. The first connection electrode 127 is electrically connected to the first detection electrode 117, and extended in the −Y direction. The first connection electrode 127 is electrically connected to the −X direction end of the −Y direction-facing side of the first detection electrode 117. The first connection electrode 128 is electrically connected to the first detection electrode 118, and extended in the −Y direction. The first connection electrode 128 is electrically connected to the −X direction end of the −Y direction-facing side of the first detection electrode 118.

Regarding the sizes of the first connection electrodes 121 to 128 in the plan view, the first connection electrodes 125 to 128 close to a protruded portion 13B for a terminal of the substrate 13 are the smallest, and the first connection electrodes 122 and 123 the farthest from the protruded portion 13B are the largest. The first connection electrodes 121 and 124 apart from the protruded portion 13B at a distance between the distance of the first connection electrodes 122 and 123 from the protruded portion 13B and the distance of the first connection electrodes 125 to 128 from the protruded portion 13B have a middle size. Reasons for this will be described below.

The first interconnects 131 to 138 are respectively electrically connected to the first connection electrodes 121 to 128, and extended along the edge of the substrate 13 outside the region 13A on the upper face of the substrate 13. The first interconnects 131 to 138 respectively form eight pairs with the first noise cancelling interconnects 141 to 148. More specifically, the first interconnect 131 and the first noise cancelling interconnect 141 form the first pair, and similarly, the first interconnects 132 to 138 and the first noise cancelling interconnects 142 to 148 form the second to eighth pairs. The eighth pair includes the first interconnect 138 and the first noise cancelling interconnect 148.

The first interconnects 131 to 138 and the first noise cancelling interconnects 141 to 148 are included in the electroconductive layer 13L on the upper face of the substrate 13, and thus positioned on the same face. In each of the pairs, the first interconnect (one of 131 to 138) and the first noise cancelling interconnect (one of 141 to 148) are formed next to each other. For example, as illustrated in FIG. 6, the first interconnect 138 is extended next to the first noise cancelling interconnect 148 along the first noise cancelling interconnect 148.

The first interconnects 131 to 138 are respectively electrically connected to the first detection electrodes 111 to 118 via the first connection electrodes 121 to 128. The first detection electrodes 111 to 118, the first connection electrodes 121 to 128, and the first interconnects 131 to 138 are insulated from the first noise cancelling interconnects 141 to 148, and also are insulated from the second detection electrodes 151 to 155, the second connection electrodes 161 to 165, the second interconnects 171 to 175, and the second noise cancelling interconnects 181 to 185.

The first noise cancelling interconnects 141 to 148 are respectively extended along the first interconnects 131 to 138 outside the region 13A on the upper face of the substrate 13. The first noise cancelling interconnects 141 to 148 are provided to obtain noise to be used when the below-described control section cancels noise generated in the first interconnects 131 to 138.

The first widened portions 141A to 148A are respectively electrically connected to the end portions of the first noise cancelling interconnects 141 to 148 that are towards the first detection electrodes 111 to 118. The first noise cancelling interconnects 141 to 148 are respectively extended towards the protruded portion 13B of the substrate 13 from the first widened portions 141A to 148A along the first interconnects 131 to 138. The first noise cancelling interconnects 141 to 148 are equal in line width and thickness to the first interconnects 131 to 138, and the lengths of the first noise cancelling interconnects 141 to 148 are respectively made uniform to the lengths of the first interconnects 131 to 138. This is because the noise respectively received by the first noise cancelling interconnects 141 to 148 is made uniform to the noise respectively received by the first interconnects 131 to 138. The phrase "the lengths of . . . are respectively made uniform to the lengths of . . . " means that the lengths are the same or have such a difference as to give no impact to cancellation of noise even if the lengths are not strictly the same due to, for example, structural limitations. Also, although the presence of, for example, a hand around the panel results in change in capacitance of the interconnects 131 to 138, the first noise cancelling interconnects 141 to 148 also change in capacitance to the same extent, whereby noise cancellation is achievable.

The first widened portions 141A to 148A are respectively disposed next to the first connection electrodes 121 to 128. The first widened portions 141A to 148A are provided to obtain noise to be used when the below-described control section cancels noise generated in the first connection electrodes 121 to 128. The first widened portions 141A to 148A have a larger line width than the first noise cancelling interconnects 141 to 148. The line width refers to a width, in the plan view, relative to the direction in which the first noise cancelling interconnects 141 to 148 are extended. The line widths of the first widened portions 141A to 148A are, as one example, respectively equal to the line widths of the first connection electrodes 121 to 128. The first widened portions 141A to 148A respectively obtain the same level of noise as the noise respectively obtained by the first connection electrodes 121 to 128.

Here, description will be given to an embodiment in which the first noise cancelling interconnects 141 to 148 are provided to respectively cancel noise generated in the first interconnects 131 to 138, and also the first widened portions 141A to 148A are provided to respectively cancel noise generated in the first connection electrodes 121 to 128. Another possible configuration is that respective noise of the first interconnects 131 to 138 and the first connection electrodes 121 to 128 that are electrically connected to each other is cancelled by the first noise cancelling interconnects 141 to 148 and the first widened portions 141A to 148A that are electrically connected to each other.

The second detection electrodes 151 to 155 are provided in the region 13A between the eight first detection electrodes 111 to 118. This is for attempting to reduce the size of the electrostatic input device 100. The second detection electrode 151 is extended in a shape of the letter L between the end side extending in the Y direction on the +X direction side of the first detection electrode 111, the end side extending in the X direction on the −Y direction side of the first detection electrode 111, and the first detection electrodes 112 and 115. The second detection electrode 152 is extended in a shape of the letter L between the end side extending in the Y direction on the −X direction side of the first detection electrode 116, the end side extending in the X direction on the +Y direction side of the first detection electrode 116, and the first detection electrodes 112 and 115. The second detection electrode 153 is extended in a cross shape between the first detection electrodes 112, 113, 116, and 117. The second detection electrode 154 is extended in a shape of the letter L between the end side extending in the Y direction on the +X direction side of the first detection electrode 117, the end side extending in the X direction on the +Y direction side of the first detection electrode 117, and the first detection electrodes 113 and 118. The second detection electrode 155 is extended in a shape of the letter L between the end side extending in the Y direction on the −X direction side of the first detection electrode 114, the end side extending in the X direction on the −Y direction side of the first detection electrode 114, and the first detection electrodes 113 and 118. The second connection electrodes 161 to 165 are respectively electrically connected to the second detection electrodes 151 to 155.

The second connection electrodes 161 to 165 respectively electrically connect the second detection electrodes 151 to 155 and the second interconnects 171 to 175 to each other. The second connection electrodes 161 to 165 are provided outside the region 13A on the upper face of the substrate 13.

The second connection electrode 161 is electrically connected to a position the closest to the protruded portion 13B around the periphery of the region 13A, of the portions of the second detection electrode 151 that are in contact with the region 13A. Therefore, the position at which the second connection electrode 161 is electrically connected to the second detection electrode 151 is next to the end portion of the first detection electrode 115 on the +Y direction side of the end side extending in the Y direction on the −X direction side of the first detection electrode 115. The second interconnect 171 is electrically connected to the second connection electrode 161.

The second connection electrode 162 is electrically connected to a position the closest to the protruded portion 13B around the periphery of the region 13A, of the portions of the second detection electrode 152 that are in contact with the region 13A. Therefore, the position at which the second connection electrode 162 is electrically connected to the second detection electrode 152 is next to the end portion of the first detection electrode 116 on the −X direction side of the end side extending in the X direction on the −Y direction side of the first detection electrode 116. The second interconnect 172 is electrically connected to the second connection electrode 162.

The second connection electrode 163 is electrically connected to a position the closest to the protruded portion 13B around the periphery of the region 13A, of the portions of the second detection electrode 153 that are in contact with the region 13A. Therefore, the position at which the second connection electrode 163 is electrically connected to the second detection electrode 153 is a central portion of the line width in the X direction on the −Y direction side of the second detection electrode 153 having a cross shape in the plan view. The second interconnect 173 is electrically connected to the second connection electrode 163.

The second connection electrode 164 is electrically connected to a position the closest to the protruded portion 13B around the periphery of the region 13A, of the portions of the second detection electrode 154 that are in contact with the region 13A. Therefore, the position at which the second connection electrode 164 is electrically connected to the second detection electrode 154 is next to the end portion of the first detection electrode 117 on the −X direction side of the end side extending in the X direction on the −Y direction side of the first detection electrode 117. The second interconnect 174 is electrically connected to the second connection electrode 164.

The second connection electrode 165 is electrically connected to a position the closest to the protruded portion 13B around the periphery of the region 13A, of the portions of the second detection electrode 155 that are in contact with the region 13A. Therefore, the position at which the second connection electrode 165 is electrically connected to the second detection electrode 155 is next to the end portion of the first detection electrode 118 on the +Y direction side of the end side extending in the Y direction on the +X direction side of the first detection electrode 118. The second interconnect 175 is electrically connected to the second connection electrode 165.

The second interconnects 171 to 175 are respectively electrically connected to the second connection electrodes 161 to 165, and extended along the edge of the substrate 13 outside the region 13A on the upper face of the substrate 13. The second interconnects 171 to 175 respectively form five pairs with the second noise cancelling interconnects 181 to 185. Specifically, the second interconnect 171 and the second noise cancelling interconnect 181 form the first pair, and the second interconnects 172 to 175 and the second noise cancelling interconnects 182 to 185 form the second to fifth pairs. The fifth pair includes the second interconnect 175 and the second noise cancelling interconnect 185.

The second interconnects 171 to 175 and the second noise cancelling interconnects 181 to 185 are included in the electroconductive layer 13L on the upper face of the substrate 13, and thus positioned on the same face. In each of the pairs, the second interconnect (one of 171 to 175) and the second noise cancelling interconnect (one of 181 to 185) are formed next to each other. For example, as illustrated in FIG. 6, the second interconnect 174 is extended next to the second noise cancelling interconnect 184 along the second noise cancelling interconnect 184, and the second interconnect 175 is extended next to the second noise cancelling interconnect 185 along the second noise cancelling interconnect 185.

The second interconnects 171 to 175 are respectively electrically connected to the second detection electrodes 151 to 155 via the second connection electrodes 161 to 165. The second detection electrodes 151 to 155, the second connection electrodes 161 to 165, and the second interconnects 171 to 175 are insulated from the second noise cancelling interconnects 181 to 185, and also are insulated from the first detection electrodes 111 to 118, the first connection electrodes 121 to 128, the first interconnects 131 to 138, and the first noise cancelling interconnects 141 to 148.

The second noise cancelling interconnects 181 to 185 are extended along the second interconnects 171 to 175 outside the region 13A on the upper face of the substrate 13. The second noise cancelling interconnects 181 to 185 are provided to obtain noise to be used when the below-described control section cancels noise generated in the second interconnects 171 to 175.

The second widened portions 181A to 185A are respectively electrically connected to the end portions of the second noise cancelling interconnects 181 to 185 that are towards the second detection electrodes 151 to 155. The second noise cancelling interconnects 181 to 185 are respectively extended towards the protruded portion 13B of the substrate 13 from the second widened portions 181A to 185A along the second interconnects 171 to 175. The second noise cancelling interconnects 181 to 185 are equal in line width and thickness to the second interconnects 171 to 175, and the lengths of the second noise cancelling interconnects 181 to 185 are respectively made uniform to the lengths of the second interconnects 171 to 175. This is because the noise respectively received by the second noise cancelling interconnects 181 to 185 is made uniform to the noise respectively received by the second interconnects 171 to 175. The phrase "the lengths of . . . are respectively made uniform to the lengths of . . ." means that the lengths are the same or have such a difference as to give no impact to cancellation of noise even if the lengths are not strictly the same due to, for example, structural limitations.

The second widened portions 181A to 185A are respectively disposed next to the second connection electrodes 161 to 165. The second widened portions 181A to 185A are provided to obtain noise to be used when the below-described control section cancels noise generated in the second connection electrodes 161 to 165. The second widened portions 181A to 185A have a larger line width than the second noise cancelling interconnects 181 to 185. The line width refers to a width, in the plan view, relative to the direction in which the second noise cancelling interconnects 181 to 185 are extended. The line width of the second widened portions 181A to 185A is, as one example, respectively equal to the line width of the second connection electrodes 161 to 165. The second widened portions 181A to 185A respectively obtain the same level of noise as the noise respectively obtained by the second connection electrodes 161 to 165.

Here, description will be given to an embodiment in which the second noise cancelling interconnects 181 to 185 are provided to respectively cancel noise generated in the second interconnects 171 to 175, and also the second widened portions 181A to 185A are provided to respectively cancel noise generated in the second connection electrodes 161 to 165. Another possible configuration is that respective noise of the second interconnects 171 to 175 and the second connection electrodes 161 to 165 that are electrically connected to each other is cancelled by the second noise cancelling interconnects 181 to 185 and the second widened portions 181A to 185A that are electrically connected to each other.

Figure 7:
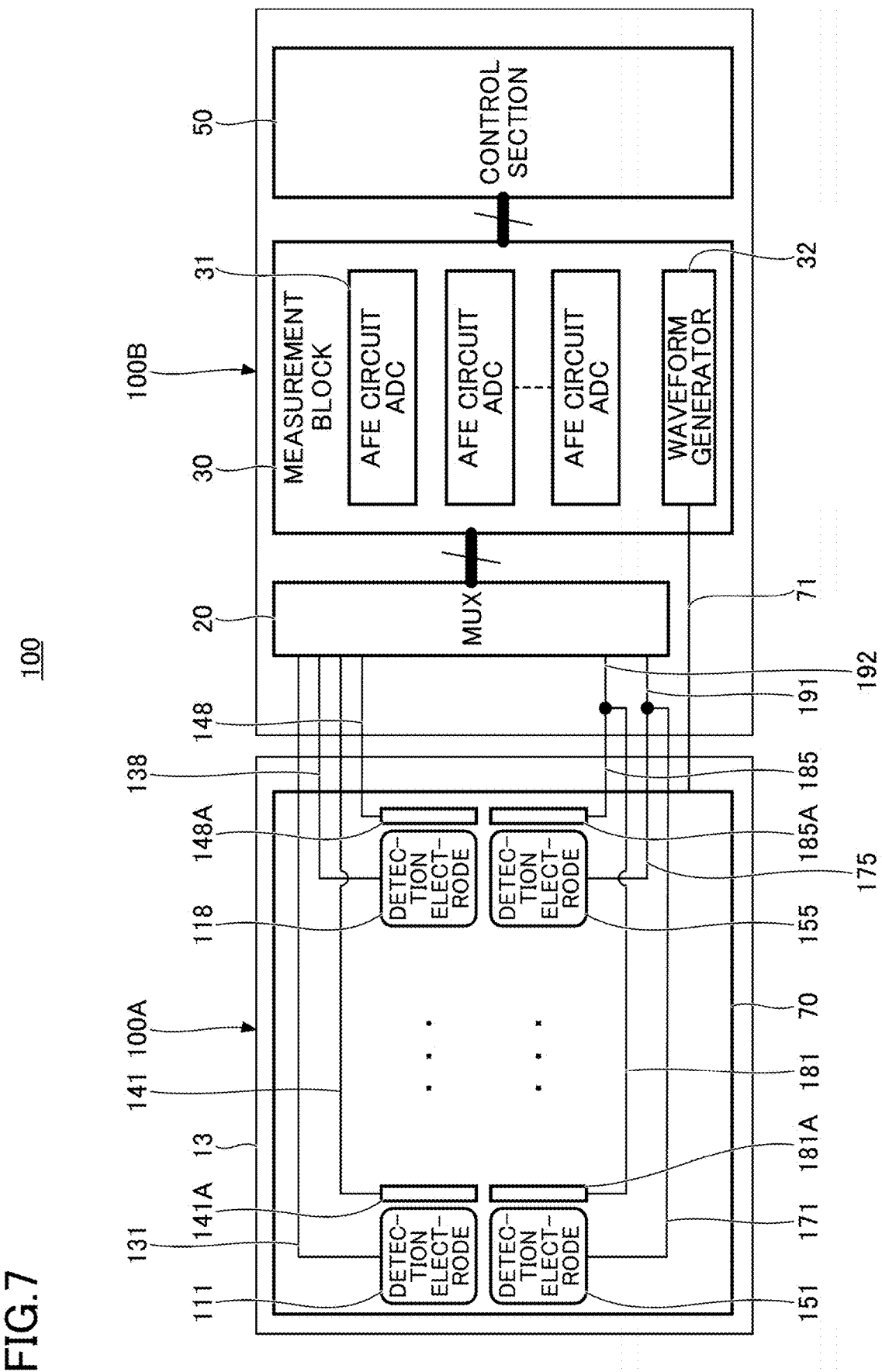
FIG. 7 is a view of a configuration of the electrostatic input device 100.

FIG. 7 is a view of a configuration of the electrostatic input device 100. The electrostatic input device 100 includes an input section 100A and a detection circuit 100B. Although the input section 100A has the configuration as illustrated in FIG. 5, this configuration is illustrated in FIG. 7 in a simplified manner. FIG. 7 illustrates, among the components of the input section 100A, the first detection electrodes 111 to 118, the first interconnects 131 to 138, the first noise cancelling interconnects 141 to 148, the first widened portions 141A to 148A, the second detection electrodes 151 to 155, the second interconnects 171 and 175, the second noise cancelling interconnects 181 and 185, and the second widened portions 181A to 185A. In FIG. 7, the first connection electrodes 121 to 128 and the second connection electrodes 161 to 165 are omitted. Although the second interconnects 172 to 174 are omitted in FIG. 7, description will be made assuming that the second interconnects 172 to 174 are between the second interconnects 171 and 175. Although the second noise cancelling interconnects 182 to 184 are omitted in FIG. 7, description will be made assuming that the second noise cancelling interconnects 182 to 184 are between the second noise cancelling interconnects 181 and 185. FIG. 7 schematically illustrates the interconnects included in the input section 100A.

The first detection electrodes 111 to 118, the first interconnects 131 to 138, the first noise cancelling interconnects 141 to 148, the first widened portions 141A to 148A, the second detection electrodes 151 to 155, the second interconnects 171 to 175, the second noise cancelling interconnects 181 to 185, and the second widened portions 181A to 185A are disposed on the upper side of the active shield electrode 70. The first connection electrodes 121 to 128 and the second connection electrodes 161 to 165, which are omitted in FIG. 7, are also disposed on the upper side of the active shield electrode 70.

The second interconnects 171 to 175 are electrically connected together in a detection circuit 100B, and one interconnect 191 is electrically connected to a MUX 20. The second noise cancelling interconnects 181 to 185 are electrically connected together in the detection circuit 100B, and one interconnect 192 is electrically connected to the MUX.

The detection circuit 100B includes a multiplexer (MUX) 20, a measurement block 30, and a control section 50. The input side of the MUX 20 is electrically connected to the first detection electrodes 111 to 118 via the first interconnects 131 to 138, and also to the first noise cancelling interconnects 141 to 148. The second detection electrodes 151 to 155 are electrically connected to the MUX 20 via the second interconnects 171 to 175 and the interconnect 191. The second noise cancelling interconnects 181 to 185 are electrically connected to the MUX 20 via the interconnect 192. The output side of the MUX 20 is electrically connected to the measurement block 30. The MUX 20 sequentially switches the connection between the input side and the output side when the measurement block 30 measures the capacitance of each of the first detection electrodes 111 to 118, the combined capacitance of the first noise cancelling interconnects 141 to 148, the capacitance of the second detection electrodes 151 to 155, and the combined capacitance of the second noise cancelling interconnects 181 to 185.

The measurement block 30 includes 16 measurement sections 31 and one waveform generator 32. Each of the measurement sections 31 includes an AFE circuit and an analog to digital converter (ADC). The 16 measurement sections, in the first sequence, perform signal adjustment and AD conversion for the capacitance of the first detection electrodes 111 to 118 and the capacitance of the first noise cancelling interconnects 141 to 148, and output to the control section 50. The 16 measurement sections, in the second sequence, perform signal adjustment and AD conversion for the combined capacitance of the second detection electrodes 151 to 155 and the combined capacitance of the second noise cancelling interconnects 181 to 185, and output to the control section 50. Here, the capacitance of the first detection electrodes 111 to 118 is measured via the first connection electrodes 121 to 128 and the first interconnects 131 to 138, and includes the capacitance in the first connection electrodes 121 to 128 and the first interconnects 131 to 138. The combined capacitance of the second detection electrodes 151 to 155 is measured via the second connection electrodes 161 to 165 and the second interconnects 171 to 175, and includes the capacitance in the second connection electrodes 161 to 165 and the second interconnects 171 to 175.

The waveform generator 32 is electrically connected to the active shield electrode 70 via the interconnect 71, and applies an alternating current signal to the active shield electrode 70 as an active shield signal. The active shield electrode 70 is provided to shield the first detection electrodes 111 to 118, the first connection electrodes 121 to 128, the first interconnects 131 to 138, the first noise cancelling interconnects 141 to 148, the second detection electrodes 151 to 155, the second connection electrodes 161 to 165, the second interconnects 171 to 175, and the second noise cancelling interconnects 181 to 185 from, for example, noise of the LCD 14.

The control section 50 calculates and outputs a difference between the capacitance of each of the first detection electrodes 111 to 118 and a predetermined reference value. The control section 50 performs the following processing to the measurement values of the capacitance of the first detection electrodes 111 to 118, which are input from the measurement block 30. Specifically, the control section 50 calculates an average of the measurement values of the capacitance obtained through twice or more sequential measurements when the measurement values of the capacitance of the first detection electrodes 111 to 118 are lower than a threshold value. Subsequently, the control section 50 obtains the calculated average as a reference value in measuring the capacitance of the first detection electrodes 111 to 118. The control section 50 subtracts the reference value from the measurement values of the capacitance of the first detection electrodes 111 to 118, to determine a difference of the capacitance in accordance with the distance between the first detection electrodes 111 to 118 and the hand.

The control section 50 also performs a similar processing performed to the capacitance of the first detection electrodes 111 to 118, to the capacitance of each of the first noise cancelling interconnects 141 to 148, the combined capacitance of the second detection electrodes 151 to 155, and the combined capacitance of the second noise cancelling interconnects 181 to 185, to determine a difference of the capacitance of the first noise cancelling interconnects 141 to 148, a difference of the combined capacitance of the second detection electrodes 151 to 155, and a difference of the combined capacitance of the second noise cancelling interconnects 181 to 185. Each of the differences is a value in accordance with the distance between the hand and the panel 12.

The control section 50 subtracts the differences calculated for the first noise cancelling interconnects 141 to 148 from the differences calculated for the first detection electrodes 111 to 118, to thereby cancel components of noise included in the differences calculated for the first connection electrodes 121 to 128 and the first interconnects 131 to 138. The control section 50 subtracts the difference calculated for the combined capacitance of the second noise cancelling interconnects 181 to 185 from the difference calculated for the combined capacitance of the second detection electrodes 151 to 155, to thereby cancel components of noise included in the difference calculated for the combined capacitance of the second connection electrodes 161 to 165 and the second interconnects 171 to 175.

Figure 8:
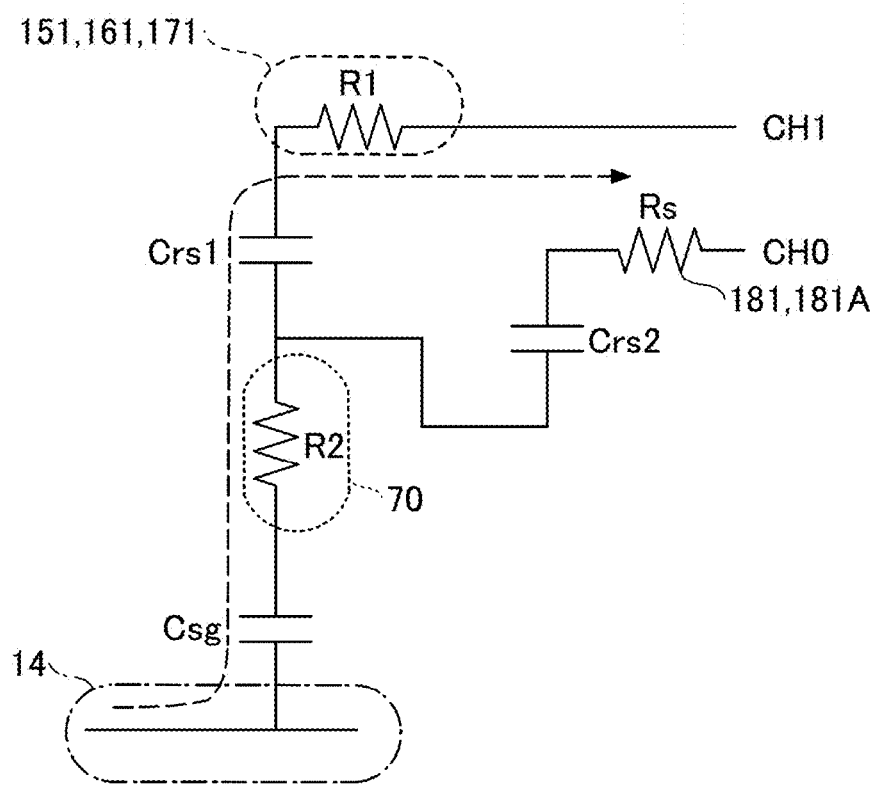
FIG. 8 is an explanatory view of cancellation of noise in a second detection electrode 151.

FIG. 8 is an explanatory view of cancellation of noise in the second detection electrode 151. FIG. 8 illustrates: a resistor R1 corresponding to the second detection electrode 151, the second connection electrode 161, and the second interconnect 171; a resistor R2 corresponding to the active shield electrode 70; the LCD 14; and a resistor Rs corresponding to the second noise cancelling interconnect 181 and the second widened portion 181A. The capacitance between the resistor R1, corresponding to the second detection electrode 151, the second connection electrode 161, and the second interconnect 171, and the resistor R2, corresponding to the active shield electrode 70, is illustrated as a capacitor Crs1. The capacitor Crs1 is capacitance mainly between the second detection electrode 151 and the active shield electrode 70. The capacitance between the resistor R2, corresponding to the active shield electrode 70, and the LCD 14 is illustrated as a capacitor Csg. The capacitance between the second noise cancelling interconnect 181 and the second widened portion 181A, and the active shield electrode 70 is illustrated as a capacitor Crs2. The combined area of the second detection electrode 151, the second connection electrode 161, and the second interconnect 171 is different from the combined area of the second noise cancelling interconnect 181 and the second widened portion 181A. Thus, addition of a capacitor makes the capacitance of the capacitor Crs1 and the capacitance of the capacitor Crs2 equal to each other.

In FIG. 8, the noise applied to a large area, such as the noise generated in the LCD 14, is transmitted, as indicated by the dashed-line arrow, to the active shield electrode 70 through the capacitor Csg, and further to the second detection electrode 151, the second connection electrode 161, and the second interconnect 171 through the capacitor Crs1. Similarly, the noise generated in the LCD 14 is transmitted to the active shield electrode 70 through the capacitor Csg, and further to the second noise cancelling interconnect 181 and the second widened portion 181A through the capacitor Crs2. Therefore, by respectively making the lengths of the second interconnect 171 and the second noise cancelling interconnect 181 uniform to respectively make time constants uniform and enabling the second connection electrode 161 and the second widened portion 181A to obtain the same level of noise, the control section 50 can cancel an impact of noise received by the second connection electrode 161 and the second interconnect 171 from the differences calculated for the second detection electrode 151, the second connection electrode 161, and the second interconnect 171 by subtracting the differences calculated for the second noise cancelling interconnect 181 and the second widened portion 181A from the differences calculated for the second detection electrode 151, the second connection electrode 161, and the second interconnect 171. Since the equivalent circuit as illustrated in FIG. 8 is also present for the second detection electrodes 152 to 155, the control section 50 can cancel an impact of noise received by the second connection electrodes 162 to 165 and the second interconnects 172 to 175 from the differences calculated for the second detection electrodes 152 to 155, the second connection electrodes 162 to 165, and the second interconnects 172 to 175.

The region where the second detection electrodes 151 to 155 are present is relatively large. Thus, configuring with one detection electrode would result in broadened distributions of resistance and capacitance. This would make it difficult to respectively match the phase differences between the second detection electrodes 151 to 155 and the second noise cancelling interconnects 181 to 185. With the divided second detection electrodes 151 to 155, the phase differences between the second detection electrodes 151 to 155 and the second noise cancelling interconnects 181 to 185 become matched more readily. This makes such a configuration as to readily cancel noise.

Figure 9A:
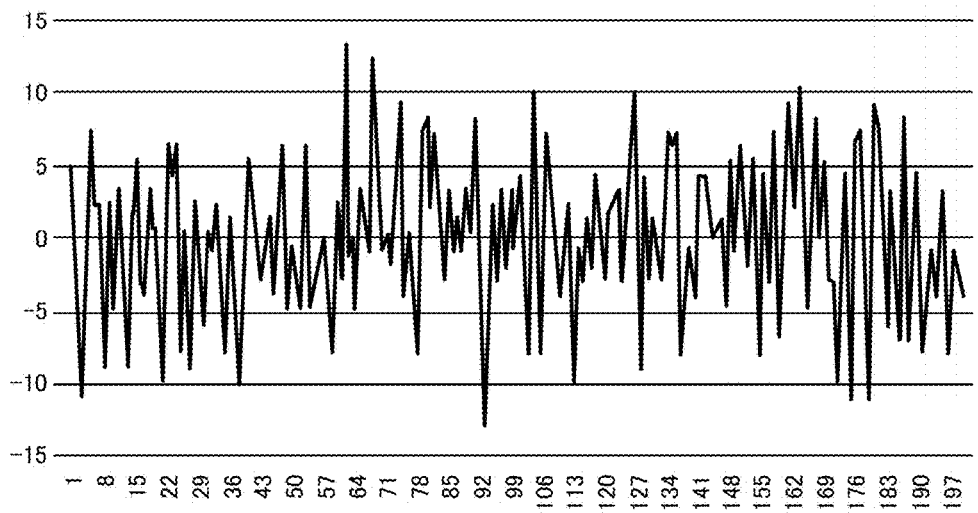
FIGS. 9A to 9C are explanatory views of a difference obtained by cancelling noise calculated for the first detection electrode 111.
Figure 9B:
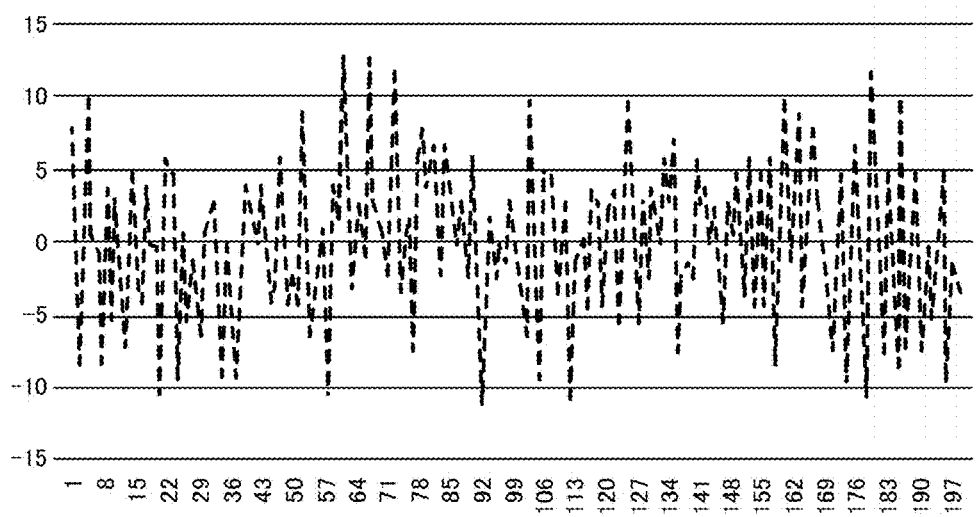
Figure 9C:
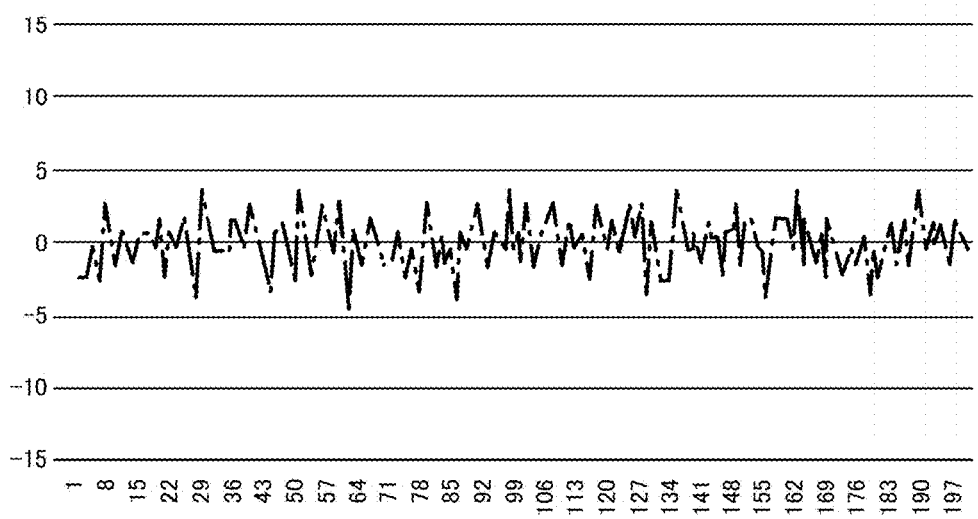

FIGS. 9A to 9C are explanatory views of a difference obtained by cancelling noise calculated for the first detection electrode 111. FIG. 9A illustrates a difference calculated by the control section 50 for the first detection electrode 111. FIG. 9B illustrates a difference calculated by the control section 50 for the first noise cancelling interconnect 141 and the first widened portion 141A. FIG. 9C illustrates the result obtained by subtracting the difference of FIG. 9B from the difference of FIG. 9A.

The difference as illustrated in FIG. 9A is obtained by subtracting the reference value from the total capacitance of the capacitance of the first detection electrode 111 and the capacitance of the first connection electrode 121 and the first interconnect 131, and includes the noise components obtained by the first detection electrode 111, and the first connection electrode 121 and the first interconnect 131. The difference as illustrated in FIG. 9B is obtained by subtracting the reference value from the capacitance of the first noise cancelling interconnect 141 and the first widened portion 141A. By combining the capacitor Crs2 and the resistor Rs with the capacitor Crs1 and resistor R2, the noise components obtained by the first detection electrode 111, the first connection electrode 121, and the first interconnect 131 can be combined with the noise components obtained by the first noise cancelling interconnect 141 and the first widened portion 141A. Therefore, the difference as illustrated in FIG. 9C, which is obtained by subtracting the difference of FIG. 9B from the difference of FIG. 9A, represents a difference obtained by subtracting the reference value from the capacitance obtained by the first detection electrode 111 only. In this manner, by using the first noise cancelling interconnect 141 and the first widened portion 141A, it is possible to highly precisely obtain the difference obtained by the first detection electrode 111 only. Such a highly precise difference can also be determined for the first detection electrodes 112 to 118 in the same manner.

Figure 10A:
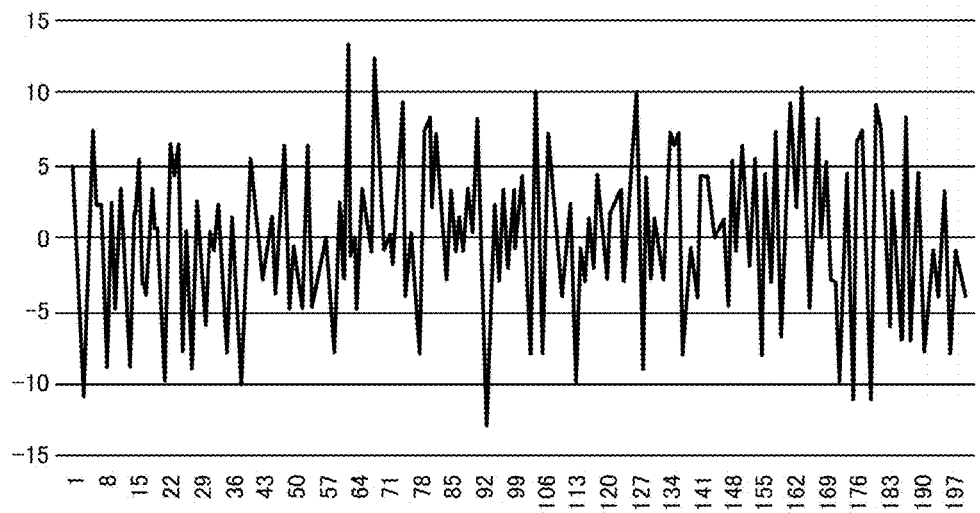
FIGS. 10A to 10C are explanatory views of a difference obtained by cancelling noise calculated for the second detection electrodes 151 to 155.
Figure 10B:
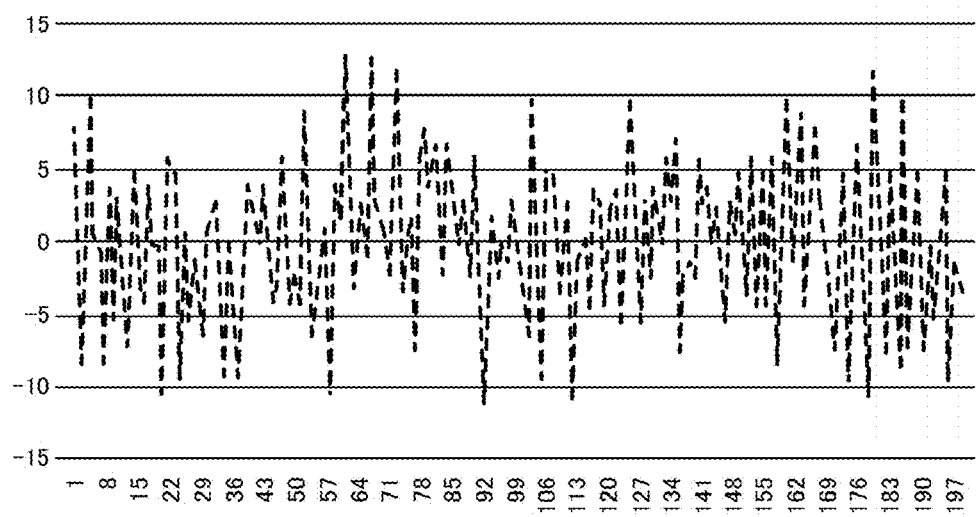
Figure 10C:
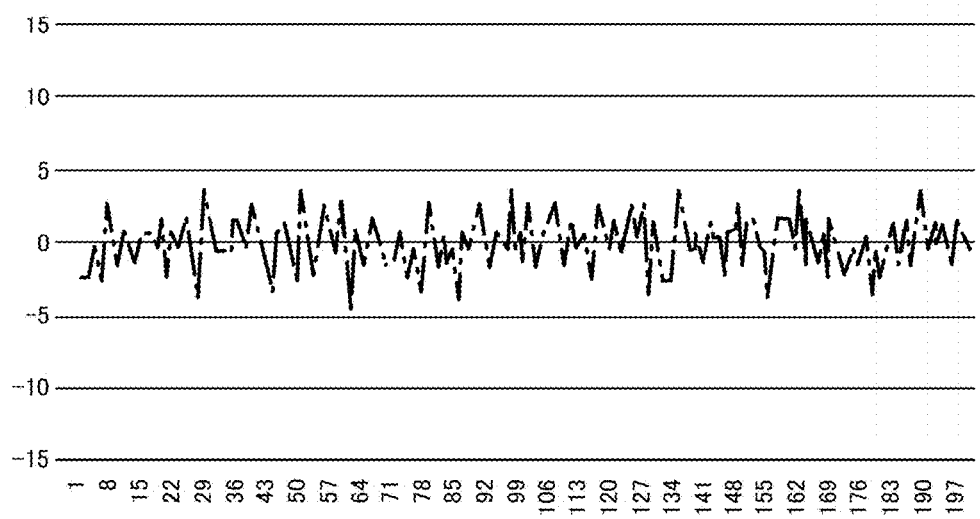

FIGS. 10A to 10C are explanatory views of a difference obtained by cancelling noise calculated for the second detection electrodes 151 to 155. FIG. 10A illustrates the difference of the second detection electrodes 151 to 155 combined by the control section 50. FIG. 10B illustrates the difference of the second noise cancelling interconnects 181 to 185 and the second widened portions 181A to 185A combined by the control section 50. FIG. 10C illustrates the result obtained by subtracting the difference of FIG. 10B from the difference of FIG. 10A.

The difference illustrated in FIG. 10A is obtained by subtracting the reference value from the total capacitance of the capacitance of the second detection electrodes 151 to 155 and the capacitance of the second connection electrodes 161 to 165 and the second interconnects 171 to 175, and includes the noise components obtained by the second detection electrodes 151 to 155, the second connection electrodes 161 to 165, and the second interconnects 171 to 175. The difference as illustrated in FIG. 10B is obtained by subtracting the reference value from the capacitance of the second noise cancelling interconnects 181 to 185 and the second widened portions 181A to 185A. The circuit constant of an electrical circuit is adjusted so that the noise components obtained by the first detection electrode 111, the first connection electrode 121, and the first interconnect 131 are as large as the noise components obtained by the first noise cancelling interconnect 141 and the first widened portion 141A. Therefore, the difference as illustrated in FIG. 10C, which is obtained by subtracting the difference of FIG. 10B from the difference of FIG. 10A, represents a difference obtained by subtracting the reference value from the capacitance obtained by the second detection electrodes 151 to 155 only. In this manner, by using the second noise cancelling interconnects 181 to 185 and the second widened portions 181A to 185A, it is possible to highly precisely obtain the difference obtained by the second detection electrodes 151 to 155.

When the second detection electrode is not divided into the second detection electrodes 151 to 155, it follows that one large detection electrode including the second detection electrodes 151 to 155 is used. A larger detection electrode results in a larger variation in the length of a path from any point of the detection electrode to a connection electrode. Especially when a transparent electrode is used as the detection electrode, the resistance is high and the impact by the length of a path is large.

However, by dividing the second detection electrode into the five second detection electrodes 151 to 155, the differences in length of the paths from any point of the second detection electrodes 151 to 155 to the second connection electrodes 161 to 165 become smaller. Moreover, noise can be cancelled by the second noise cancelling interconnects 181 to 185 and the second widened portions 181A to 185A that are provided for noise cancelling.

For the above reason, the second detection electrodes 151 to 155 are provided in the region 13A between the eight first detection electrodes 111 to 118. Thus, the electrostatic input device 100 can be reduced in size.

Accordingly, it is possible to provide the electrostatic input device 100 that can be reduced in size. The electrostatic input device 100 includes the five divided second detection electrodes 151 to 155 as a detection electrode configured to detect approach of a hand, and also includes the second noise cancelling interconnects 181 to 185 and the second widened portions 181A to 185A for noise cancelling. Since the lengths of the second noise cancelling interconnects 181 to 185 are respectively made uniform to the lengths of the second interconnects 171 to 175, and the time constants of the second noise cancelling interconnects 181 to 185 are respectively made uniform to the time constants of the second interconnects 171 to 175, it is possible to respectively make uniform the phases of noise respectively obtained by the second noise cancelling interconnects 181 to 185 and the phases of noise respectively obtained by the second interconnects 171 to 175. Thus, the noise respectively obtained by the second noise cancelling interconnects 181 to 185 and the noise respectively obtained by the second interconnects 171 to 175 can cancel each other. Also, since the second widened portions 181A to 185A can respectively obtain the same level of noise as the noise respectively obtained by the second connection electrodes 161 to 165, the noise respectively obtained by the second connection electrodes 161 to 165 and the noise respectively obtained by the second widened portions 181A to 185A can cancel each other. Thus, it is possible to highly precisely obtain a difference obtained only by each of the second detection electrodes 151 to 155, and to highly precisely detect approach of a hand. Also, since the five divided second detection electrodes 151 to 155 are relatively small in constant of distribution and are not prone to noise, it is possible to minimize delay of the phases of the differences respectively calculated for the second detection electrodes 151 to 155 relative to the phases of the differences respectively calculated for the first detection electrodes 111 to 118.

Also, in response to approach of the hand to the second interconnects 171 to 175, capacitance is generated between the second interconnects 171 to 175 and the hand, and the difference obtained via the second interconnects 171 to 175 is changed. However, since the second noise cancelling interconnects 181 to 185 are disposed next to the second interconnects 171 to 175, the change in the difference in response to approach of the hand to the second interconnects 171 to 175 can be cancelled by the difference obtained via the second noise cancelling interconnects 181 to 185. Thus, it is possible to highly precisely detect approach of the hand to the second detection electrodes 151 to 155.

Also, for the first detection electrodes 111 to 118 configured to detect operation, the first noise cancelling interconnects 141 to 148 and the first widened portions 141A to 148A are provided for noise cancelling. Since the lengths of the first noise cancelling interconnects 141 to 148 are respectively made uniform to the lengths of the first interconnects 131 to 138, and the time constants of the first noise cancelling interconnects 141 to 148 are respectively made uniform to the time constants of the first interconnects 131 to 138, it is possible to respectively make uniform the phases of noise respectively obtained by the first noise cancelling interconnects 141 to 148 and the phases of noise respectively obtained by the first interconnects 131 to 138. Thus, the noise respectively obtained by the first interconnects 131 to 138 and the noise respectively obtained by the first noise cancelling interconnects 141 to 148 can cancel each other. Also, the first widened portions 141A to 148A can respectively obtain the same level of noise as the noise respectively obtained by the first connection electrodes 121 to 128. Thus, the noise respectively obtained by the first widened portions 141A to 148A and the noise respectively obtained by the first connection electrodes 121 to 128 can cancel each other. Therefore, it is possible to highly precisely obtain a difference obtained only by each of the first detection electrodes 111 to 118. As a result, which of the icons 12A is operated in a touchless manner can be highly precisely determined.

Also, in response to approach of the hand to the first interconnects 131 to 138, capacitance is generated between the first interconnects 131 to 138 and the hand, and the difference obtained via the first interconnects 131 to 138 is changed. However, since the first noise cancelling interconnects 141 to 148 are disposed next to the first interconnects 131 to 138, the change in the difference in response to approach of the hand to the first interconnects 131 to 138 can be cancelled by the difference obtained via the first noise cancelling interconnects 141 to 148. Thus, it is possible to highly precisely detect approach of the hand to the first detection electrodes 111 to 118.

Also, since the electrostatic input device 100 includes the active shield electrode 70 between the LCD 14 and the electroconductive layer 13L, the noise generated by the LCD 14 can be prevented from giving an impact to the first detection electrodes 111 to 118, the first connection electrodes 121 to 128, the first interconnects 131 to 138, the first noise cancelling interconnects 141 to 148, the first widened portions 141A to 148A, the second detection electrodes 151 to 155, the second connection electrodes 161 to 165, the second interconnects 171 to 175, the second noise cancelling interconnects 181 to 185, and the second widened portions 181A to 185A of the electroconductive layer 13L.

Although the above describes an embodiment in which the electrostatic input device 100 includes the active shield electrode 70, whether the electrostatic input device 100 includes the active shield electrode 70 is optional.

Although the above describes an embodiment in which the electrostatic input device 100 is of a self-capacitive type, the electrostatic input device 100 may be of a mutual capacitive type.

Although the above describes an embodiment in which the electrostatic input device 100 includes the five divided second detection electrodes 151 to 155 as a detection electrode configured to detect approach of a hand, one detection electrode combining the second detection electrodes 151 to 155 together may be provided instead of the second detection electrodes 151 to 155. In particular, in the case of such a size that has no problem with phase delay, such a configuration may be possible.

Figure 11:
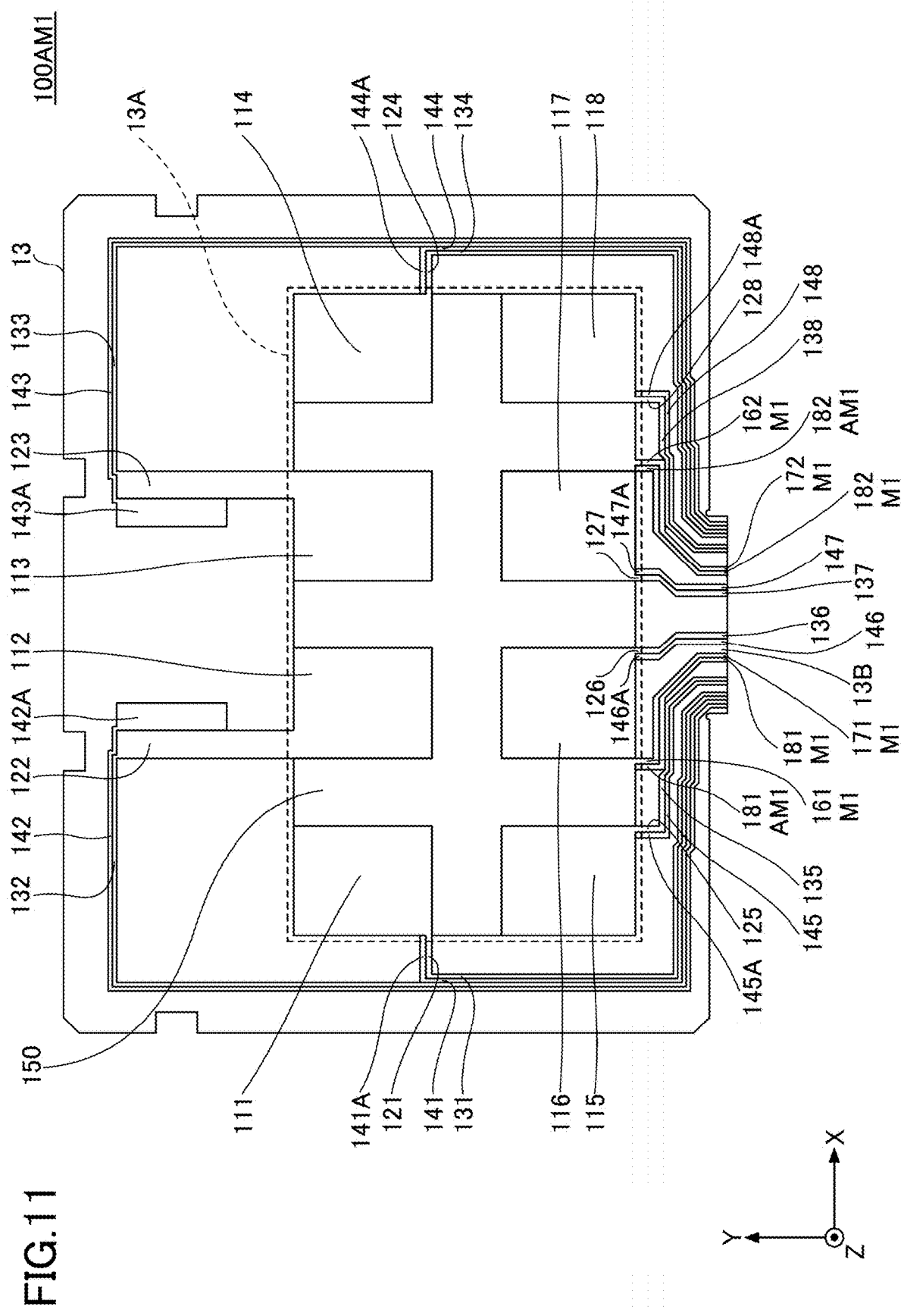
FIG. 11 is a view of an input section 100AM1 of an electrostatic input device of a first modification example of an embodiment.

FIG. 11 is a view of an input section 100AM1 of an electrostatic input device of a first modification example of an embodiment. The input section 100AM1 includes: an undivided second detection electrode 150 instead of the second detection electrodes 151 to 155 of the input section 100A as illustrated in FIG. 5; and two second connection electrodes 161M1 and 162M1 and two second interconnects 171M1 and 172M1 instead of the second connection electrodes 161 to 165 and the second interconnects 171 to 175. Also, the input section 100AM1 includes second noise cancelling interconnects 181M1 and 182M1 and second widened portions 181AM1 and 182AM1 instead of the second noise cancelling interconnects 181 to 185 and the second widened portions 181A to 185A as illustrated in FIG. 5.

Therefore, it is possible to provide an electrostatic input device that can be reduced in size (an electrostatic input device including the input section 100AM1 as illustrated in FIG. 11 instead of the input section 100A (see FIG. 5) of the electrostatic input device 100).

Figure 12:
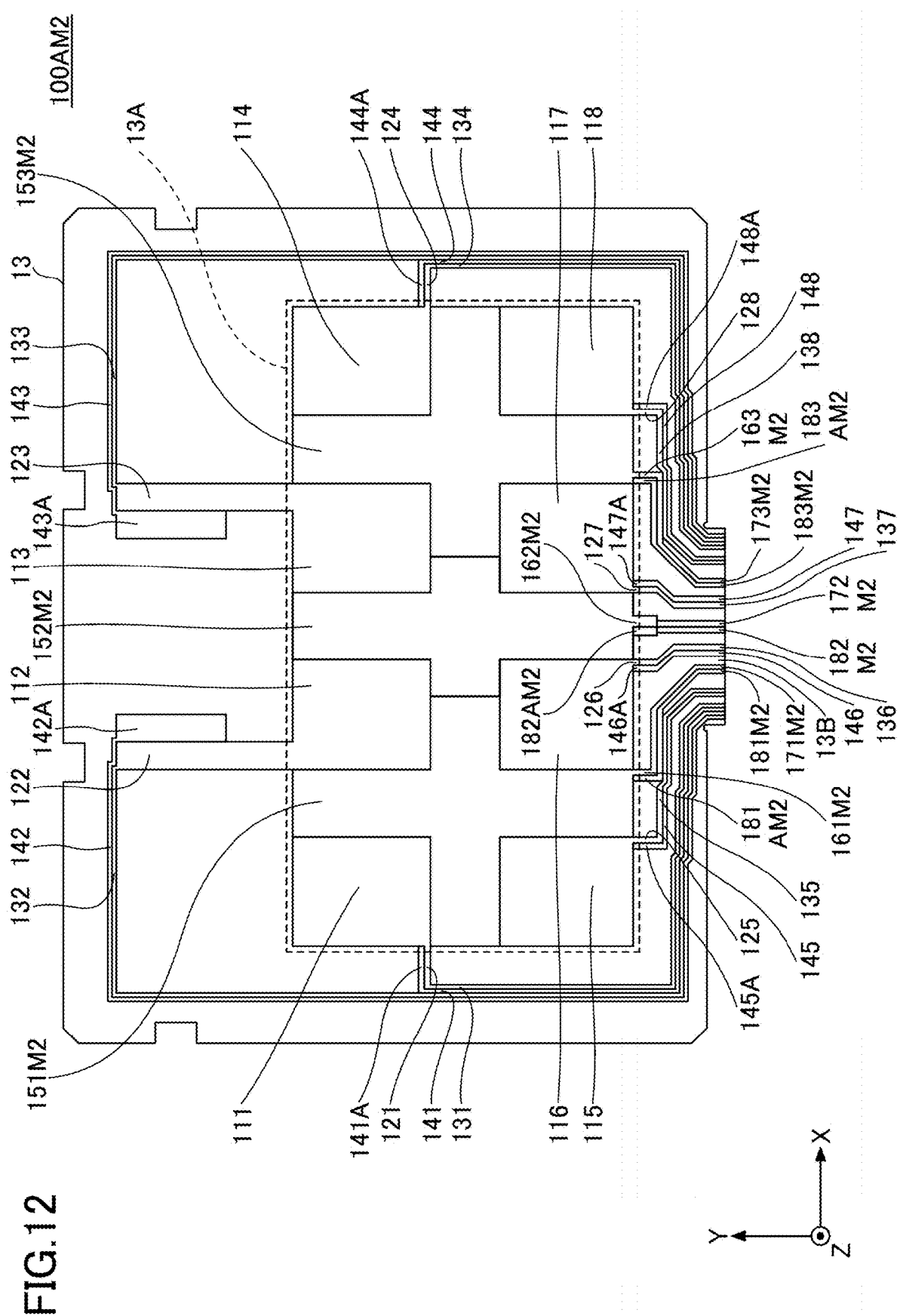
FIG. 12 is a view of an input section 100AM2 of an electrostatic input device of a second modification example of an embodiment.

FIG. 12 is a view of an input section 100AM2 of an electrostatic input device of a second modification example of an embodiment. The input section 100AM2 includes: three divided second detection electrodes 151M2 to 153M2 instead of the second detection electrodes 151 to 155 of the input section 100A as illustrated in FIG. 5; and three second connection electrodes 161M2 to 163M2 and three second interconnects 171M2 to 173M2 instead of the second connection electrodes 161 to 165 and the second interconnects 171 to 175. Also, the input section 100AM2 includes three second noise cancelling interconnects 181M2 to 183M2 and three second widened portions 181AM2 to 183AM2 instead of the second noise cancelling interconnects 181 to 185 and the second widened portions 181A to 185A as illustrated in FIG. 5.

The second detection electrode 151M2 is a combination of the second detection electrodes 151 and 152 as illustrated in FIG. 5. The second detection electrode 152M2 is the same as the second detection electrode 153 as illustrated in FIG. 5. The second detection electrode 153M2 is a combination of the second detection electrodes 154 and 155 as illustrated in FIG. 5. Also, the second connection electrode 161M2 corresponds to the second connection electrode 162 as illustrated in FIG. 5, the second connection electrode 162M2 corresponds to the second connection electrode 163 as illustrated in FIG. 5, and the second connection electrode 163M2 corresponds to the second connection electrode 164 as illustrated in FIG. 5.

The second interconnect 171M2 corresponds to the second interconnect 172 as illustrated in FIG. 5, the second interconnect 172M2 corresponds to the second interconnect 173 as illustrated in FIG. 5, and the second interconnect 173M2 corresponds to the second interconnect 174 as illustrated in FIG. 5. The second noise cancelling interconnect 181M2 corresponds to the second noise cancelling interconnect 182 as illustrated in FIG. 5, the second noise cancelling interconnect 182M2 corresponds to the second noise cancelling interconnect 183 as illustrated in FIG. 5, and the second noise cancelling interconnect 183M2 corresponds to the second noise cancelling interconnect 184 as illustrated in FIG. 5. The second widened portion 181AM2 corresponds to the second widened portion 182A as illustrated in FIG. 5, the second widened portion 182AM2 corresponds to the second widened portion 183A as illustrated in FIG. 5, and the second widened portion 183AM2 corresponds to the second widened portion 184A as illustrated in FIG. 5.

Therefore, it is possible to provide an electrostatic input device that can be reduced in size (an electrostatic input device including the input section 100AM2 as illustrated in FIG. 12 instead of the input section 100A (see FIG. 5) of the electrostatic input device 100).

Moreover, provision of the first noise cancelling interconnects 141 to 148 and the second noise cancelling interconnects 181 to 185, 181M1, 182M1, and 181M2 to 183M2 can remove noise and increase detection precision.

It is possible to provide an electrostatic input device that can be reduced in size.

While the electrostatic input devices of exemplary embodiments of the present invention have been described, the present invention is not limited to the specifically disclosed embodiments, and various modifications and changes are possible without departing from the scope of claims.

What is claimed is:

1. An electrostatic input device, comprising:
a plurality of first detection electrodes that are configured to detect approach of an object within a first distance from a detection face;
a second detection electrode that is provided between the plurality of first detection electrodes and configured to detect approach of an object within a second distance from the detection face, where the second distance is longer than the first distance;
a detection circuit that is configured to detect change in capacitance of the plurality of first detection electrodes and the second detection electrode;
a plurality of first interconnects that respectively electrically connect the plurality of first detection electrodes and the detection circuit to each other; and
a plurality of first noise cancelling interconnects that are same in number as the plurality of first interconnects, wherein the plurality of first noise cancelling interconnects are electrically connected to the detection circuit, and are respectively configured to obtain noise having a same phase as noise respectively obtained by the plurality of first interconnects.

2. The electrostatic input device according to claim 1, wherein the detection circuit is configured to detect the change in the capacitance of the plurality of first detection electrodes based on differences between a plurality of values of capacitance respectively obtained from the plurality of first detection electrodes via the plurality of first interconnects and levels of noise respectively obtained by the plurality of first noise cancelling interconnects.

3. The electrostatic input device according to claim 1, wherein:
the second detection electrode is divided into a plurality of second detection electrode sections;
the electrostatic input device further includes
a plurality of second interconnects that respectively electrically connect the plurality of second detection electrode sections and the detection circuit to each other, and
a plurality of second noise cancelling interconnects that are same in number as the plurality of second interconnects; and
the plurality of second noise cancelling interconnects are electrically connected to the detection circuit, and are respectively configured to obtain noise having a same phase as noise respectively obtained by the plurality of second interconnects.

4. The electrostatic input device according to claim 2, wherein:
the second detection electrode is divided into a plurality of second detection electrode sections;
the electrostatic input device further includes
a plurality of second interconnects that electrically connect the plurality of second detection electrode sections and the detection circuit to each other, and
a plurality of second noise cancelling interconnects that are same in number as the plurality of second interconnects; and
the plurality of second noise cancelling interconnects are electrically connected to the detection circuit, and are respectively configured to obtain noise having a same phase as noise respectively obtained by the plurality of second interconnects.

5. The electrostatic input device according to claim 3, wherein the detection circuit is configured to detect the change in the capacitance of the plurality of second detection electrode sections based on differences between a plurality of values of capacitance respectively obtained from the plurality of second detection electrode sections via the plurality of second interconnects and levels of noise respectively obtained by the plurality of second noise cancelling interconnects.

6. The electrostatic input device according to claim 4, wherein the detection circuit is configured to detect the change in the capacitance of the plurality of second detection electrode sections based on differences between a plurality of values of capacitance respectively obtained from the plurality of second detection electrode sections via the plurality of second interconnects and levels of noise respectively obtained by the plurality of second noise cancelling interconnects.

7. The electrostatic input device according to claim 3, wherein:
time constants of the plurality of first interconnects and time constants of the plurality of first noise cancelling interconnects are respectively made uniform so as to cancel noise of each other; and time constants of the plurality of second interconnects and time constants of the plurality of second noise cancelling interconnects are respectively made uniform so as to cancel noise of each other.

8. The electrostatic input device according to claim 4, wherein:
   time constants of the plurality of first interconnects and time constants of the plurality of first noise cancelling interconnects are respectively made uniform so as to cancel noise of each other; and
   time constants of the plurality of second interconnects and time constants of the plurality of second noise cancelling interconnects are respectively made uniform so as to cancel noise of each other.

9. The electrostatic input device according to claim 7, wherein:
   the plurality of first interconnects and the plurality of first noise cancelling interconnects are disposed as pairs each having the time constants that are made uniform, where the first interconnect and the first noise cancelling interconnect of each of the pairs are next to each other in a plan view; and
   the plurality of second interconnects and the plurality of second noise cancelling interconnects are disposed as pairs each having the time constants that are made uniform, where the second interconnect and the second noise cancelling interconnect of each of the pairs are next to each other in the plan view.

10. The electrostatic input device according to claim 8, wherein:
    the plurality of first interconnects and the plurality of first noise cancelling interconnects are disposed as pairs each having the time constants that are made uniform, where the first interconnect and the first noise cancelling interconnect of each of the pairs are next to each other in a plan view; and
    the plurality of second interconnects and the plurality of second noise cancelling interconnects are disposed as pairs each having the time constants that are made uniform, where the second interconnect and the second noise cancelling interconnect of each of the pairs are next to each other in the plan view.

11. The electrostatic input device according to claim 3, wherein:
    lengths of the plurality of first interconnects and lengths of the plurality of first noise cancelling interconnects are respectively made uniform; and
    lengths of the plurality of second interconnects and lengths of the plurality of second noise cancelling interconnects are respectively made uniform.

12. The electrostatic input device according to claim 4, wherein:
    lengths of the plurality of first interconnects and lengths of the plurality of first noise cancelling interconnects are respectively made uniform; and
    lengths of the plurality of second interconnects and lengths of the plurality of second noise cancelling interconnects are respectively made uniform.

13. The electrostatic input device according to claim 11, wherein:
    the plurality of first interconnects and the plurality of first noise cancelling interconnects are disposed as pairs each having the lengths that are made uniform, where the first interconnect and the first noise cancelling interconnect of each of the pairs are next to each other in a plan view; and
    the plurality of second interconnects and the plurality of second noise cancelling interconnects are disposed as pairs each having the lengths that are made uniform, where the second interconnect and the second noise cancelling interconnect of each of the pairs are next to each other in the plan view.

14. The electrostatic input device according to claim 12, wherein:
    the plurality of first interconnects and the plurality of first noise cancelling interconnects are disposed as pairs each having the lengths that are made uniform, where the first interconnect and the first noise cancelling interconnect of each of the pairs are next to each other in a plan view; and
    the plurality of second interconnects and the plurality of second noise cancelling interconnects are disposed as pairs each having the lengths that are made uniform, where the second interconnect and the second noise cancelling interconnect of each of the pairs are next to each other in the plan view.

15. The electrostatic input device according to claim 3, further comprising:
    a plurality of first connection electrodes respectively provided at connection portions between the plurality of first detection electrodes and the plurality of first interconnects;
    a plurality of second connection electrodes respectively provided at connection portions between the plurality of second detection electrode sections and the plurality of second interconnects;
    a plurality of first widened portions that are respectively electrically connected to end portions of the plurality of first noise cancelling interconnects; and
    a plurality of second widened portions that are respectively electrically connected to end portions of the plurality of second noise cancelling interconnects,
    wherein the plurality of first connection electrodes, the plurality of second connection electrodes, the plurality of first widened portions, and the plurality of second widened portions are provided outside a region where the plurality of first detection electrodes and the plurality of second detection electrode sections are provided.

16. The electrostatic input device according to claim 3, further comprising:
    a shield electrode that is electrically connected to an alternating current source configured to output an alternating current signal; and
    an insulating plate that is provided on or facing a second face of the shield electrode, where the second face of the shield electrode is on an opposite side to a first face of the shield electrode, the first face of the shield electrode being on a ground side of the shield electrode,
    wherein the plurality of first detection electrodes, the plurality of first interconnects, the plurality of first noise cancelling interconnects, the plurality of second detection electrode sections, the plurality of second interconnects, and the plurality of second noise cancelling interconnects are provided on a second face of the insulating plate, where the second face of the insulating plate is on an opposite side to a first face of the insulating plate, the first face of the insulating plate being on or facing the second face of the shield electrode, and
    the plurality of first interconnects, the plurality of first noise cancelling interconnects, the plurality of second interconnects, and the plurality of second noise cancelling interconnects are provided, on the second face of the insulating plate, outside a region where the plurality of first detection electrodes and the plurality of second detection electrode sections are provided.

17. The electrostatic input device according to claim 16, wherein:
the shield electrode and the insulating plate are transparent;
a transparent panel is provided, facing the second face of the insulating plate;
a display device is provided, facing the first face of the shield electrode;
the plurality of first detection electrodes and the plurality of second detection electrode sections are made of a transparent electrode; and
the plurality of first interconnects, the plurality of first noise cancelling interconnects, the plurality of second interconnects, and the plurality of second noise cancelling interconnects are made of a non-transparent electrical conductor.

18. The electrostatic input device according to claim 17, wherein in response to the change in the capacitance of at least one of the plurality of second detection electrode sections being detected by the detection circuit, an image is displayed on the display device.

19. The electrostatic input device according to claim 1, wherein a different operation is assigned for each of the plurality of first detection electrodes.

20. An electrostatic input device, comprising:
a plurality of detection electrodes that are configured to detect approach of an object within a first distance from a detection face;
a detection circuit that is configured to detect change in capacitance of the plurality of detection electrodes and a predetermined reference value;
a plurality of interconnects that respectively electrically connect the plurality of detection electrodes and the detection circuit to each other; and
a plurality of noise cancelling interconnects that are same in number as the plurality of interconnects,
wherein the plurality of noise cancelling interconnects are electrically connected to the detection circuit, and are respectively configured to obtain noise having a same phase as noise respectively obtained by the plurality of interconnects.

\* \* \* \* \*